(12) United States Patent
Seok (10) Patent No.: US 9,161,379 B2
(45) Date of Patent: *Oct. 13, 2015

(54) METHOD AND APPARATUS FOR TRANSMITTING DATA IN DLS WIRELESS NETWORK

(71) Applicant: LG ELECTRONICS INC., Seoul (KR)

(72) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,111

(22) Filed: Sep. 20, 2013

(65) Prior Publication Data

US 2014/0023062 A1   Jan. 23, 2014

Related U.S. Application Data

(63) Continuation of application No. 12/922,266, filed as application No. PCT/KR2009/001271 on Mar. 13, 2009, now Pat. No. 8,570,945.

(30) Foreign Application Priority Data

Mar. 14, 2008 (KR) ........................ 10-2008-0024032

(51) Int. Cl.
  *H04W 40/22* (2009.01)
  *H04W 76/02* (2009.01)
  *H04W 40/12* (2009.01)
  *H04W 88/04* (2009.01)

(52) U.S. Cl.
  CPC ............ *H04W 76/023* (2013.01); *H04W 40/22* (2013.01); *H04W 40/12* (2013.01); *H04W 88/04* (2013.01)

(58) Field of Classification Search
  CPC .......................... H04W 76/023; H04W 76/025
  See application file for complete search history.

(56) References Cited

U.S. PATENT DOCUMENTS

| | | | |
|---|---|---|---|
| 2002/0187746 A1 | 12/2002 | Cheng et al. | |
| 2003/0231608 A1 | 12/2003 | Wentink | |
| 2004/0132452 A1 | 7/2004 | Lee | |
| 2005/0122927 A1 | 6/2005 | Wentink | |
| 2006/0034200 A1 | 2/2006 | Matsumaru et al. | |
| 2006/0165035 A1* | 7/2006 | Chandra et al. | 370/329 |
| 2007/0049270 A1 | 3/2007 | Sawada | |

(Continued)

FOREIGN PATENT DOCUMENTS

KR   10-2004-0061079 A   7/2004

OTHER PUBLICATIONS

Feng, "A method to implement Inter-system communication over air," IEEE 802.16 Broadband Wireless Access Working group, Mar. 9, 2007, pp. 0-10.

Seok, "Standard Trends of Direct Link Setup (DLS)," IT Standard Weekly, Nov. 5, 2007, pp. 1-3.

*Primary Examiner* — John Blanton
(74) *Attorney, Agent, or Firm* — Birch, Stewart, Kolasch & Birch, LLP (57) ABSTRACT

A method for receiving data in a wireless local area network. The method includes establishing, by a destination station (STA), a direct link between a requesting STA and the destination STA; establishing, by the requesting STA, a relay link between the requesting STA and the destination STA; receiving, by the destination STA, data from the requesting STA through the direct link; and receiving, by the destination STA, the data from a relay STA of the relay link.

8 Claims, 4 Drawing Sheets

(56) References Cited

U.S. PATENT DOCUMENTS

| | | |
|---|---|---|
| 2007/0182274 A1 | 8/2007 | Pardo |
| 2007/0291719 A1 | 12/2007 | Demirhan et al. |
| 2008/0045212 A1 * | 2/2008 | Kim et al. .................. 455/435.1 |
| 2008/0108369 A1 | 5/2008 | Visotsky et al. |
| 2008/0144552 A1 | 6/2008 | Johansson et al. |
| 2008/0298328 A1 | 12/2008 | Sharma |
| 2009/0073921 A1 | 3/2009 | Ji et al. |
| 2010/0039980 A1 | 2/2010 | Unger |

* cited by examiner

| TDLS Type Value | Meaning |
|---|---|
| 0 | TDLS Setup Request |
| 1 | TDLS Setup Response |
| 2 | TDLS Setup Confirm |
| 3 | TDLS Teardown Request |
| 4 | TDLS Teardown Response |
| 5 | TDLS Tx Path Switch Request |
| 6 | TDLS Tx Path Switch Response |
| 7 | TDLS Rx Path Switch Request |
| 8 | TDLS Rx Path Switch Response |
| 9 | TDLS Relay Request |
| 10 | TDLS Relay Response |
| 11-255 | Reserved |

Fig. 3

| Link Identifier | Dialog Token | TCLAS | Relay Destination |

Fig. 4

| Link Identifier | Dialog Token | Status Code | RCPI 1 | RCPI 2 |

METHOD AND APPARATUS FOR TRANSMITTING DATA IN DLS WIRELESS NETWORK

The present application is a 37 C.F.R. §1.53(b) continuation of co-pending U.S. patent application Ser. No. 12/922,266 filed Sep. 13, 2010, which is a National Phase of PCT/KR2009/001271 filed on Mar. 13, 2009, and which claims the benefit of Korean Patent Application No. 10-2008-0024032, filed on Mar. 14, 2008. The entire contents of all these applications are hereby incorporated by reference.

BACKGROUND OF THE INVENTION

1. Field of the Invention

The present invention relates to a wireless local access network (WLAN) and, more particularly, to a method for transmitting data in a direct link setup (DLS) wireless network and apparatus supporting the method, and a new frame format for the data transmission method.

2. Discussion of the Related Art

Recently, diverse wireless communication technologies are under development in line with the advancement of information communication technology. Among them, a wireless local area network (WLAN) is a technique allowing mobile terminals such as personal digital assistants (PDAs), lap top computers, portable multimedia players (PMPs), and the like, to wirelessly access the Internet in particular service providing areas such as homes, offices, or aircraft based on a radio frequency technology.

The early WLAN technique supported the rate of 1~2 Mbps through frequency hopping, spread spectrum, infrared communication, and the like, by using a 2.4 GHz frequency based on IEEE 802.11. Recently, the advancement of wireless communication technology allows supporting of a maximum rate of 54 Mbps by applying orthogonal frequency division multiplex (OFDM) technology and the like to the WLAN. Further, IEEE 802 has developed a wireless communication technique for improving quality of service (QoS), allowing compatibility of access point (AP) protocols, achieving security enhancement, making radio measurement or radio resource measurement, allowing wireless access in vehicular environment, ensuring fast roaming, establishing a mesh network, performing inter-working with external network, performing wireless network management, and the like, and put those techniques into practical use, or are still developing them.

In the IEEE 802.11, a basic service set (BSS) means a set of stations STAs which are successfully synchronized with each other. A basic service area (BSA) means an area including members constituting the BSS. Varied according to propagation characteristics of a wireless medium, the BSA has a somewhat indefinite boundary. The BSS may be classified into an independent BSS (IBSS) and an infrastructure BSS. The former establishes a self-contained network, not allowing an access to a distribution system (DS). The latter, which includes one or more access points (APs) and a DS, generally refers to a BSS in which an AP is used for every communication process including communication between stations.

In an early WLAN communication procedure, the infrastructure BSS does not allow non-AP stations (STAs) to directly transmit data therebetween, requesting that data should go by way of an AP for its transmission. Meanwhile, recently, a direct link setup (DLS) is supported between Non-AP STAs to improve the efficiency of radio communication. According to this, a BSS supporting quality of service (QoS), namely, a QoS basic service set (QBSS) including a QoS station (QSTA) and a QoS access point (QAP) allows the non-AP STAs to set up a direct link and directly communicate with each other via the direct link without passing through the QAP.

SUMMARY OF THE INVENTION

As mentioned above, the existing DLS procedure is under the premise of QBSS that the BSS supports QoS. In the QBSS, the AP is the QAP supporting QoS as well as the non-AP STA. In this respect, however, in a currently generalized WLAN environment (e.g., WLAN environment following IEEE 802.11Aa/b/g, etc.), although the non-AP STA is the QSTA supporting QoS, the AP is a legacy AP that does not support QoS in most cases. As a result, in the currently generalized WLAN environment, the QSTA cannot use a DLS service.

A tunneled direct link setup (TDLS) is a radio communication protocol newly proposed to overcome such limitation. Although the TDLS does not support QoS, it allows the QSTAs to establish a direct link therebetween even in the currently generalized IEEE 802.11a/b/g, etc. Thus, the TDLS defines a general procedure for allowing the QSTAs to set up a direct link even in the BSS managed by the legacy AP. Hereinafter, a wireless network supporting the TDLS procedure is referred to as a TDLS wireless network.

User equipments (UEs) of a wireless network is in the trend of becoming small, restricting batteries included therein. Accordingly, the range in which the UEs of the wireless network to transmit/receive signals is also restricted, failing to guarantee a sufficiently broad range of a service coverage. For example, in the infrastructure network, the non-AP STA, a UE, does not have a sufficient power, so a service coverage of the BSS, i.e., a service range that can be covered by a single AP, may not be sufficiently wide.

One solution to such problem of the narrow service coverage may be installation of a larger number of APs, which, however, increases the installation costs as much. In addition, because the APs are fixed facilities, the large number of APs may become a burden to upgrading the WLAN system.

Therefore, an object of the present invention is to provide a data transmission procedure in a WLAN to extend a service coverage of a BSS in the WLAN.

Another object of the present invention is to provide a device supporting a data transmission procedure in a WLAN capable of extending a service coverage of a BSS in the WLAN.

Still another object of the present invention is to provide a new frame format capable of extending a service coverage of a BSS in a WLAN by using a direct link.

In one aspect, there is provided a data transmission procedure of a tunneled direct link setup (TDLS) wireless network, including: transmitting a TDLS relay request message including relay destination station (STA) information; receiving one or more TDLS relay response messages with respect to the TDLS relay request message from one or more stations (STAs); and selecting a relay STA from among the one or more STAs, and transmitting data desired to be transmitted to the relay destination STA, to the relay STA.

The relay STA may transmit the received data to the relay destination STA. The TDLS relay request message may include a traffic class (TCLAS) element, and only when TCLAS of the received data is matched to that included in the TDLS relay request message, the relay STA may transmit the received data for the relay destination STA.

The TDLS relay response message may include RCPI1 (Received Channel Power Indicator 1) information indicating channel quality of a reception channel from the relay destination STA and RCPI2 information indicating channel quality of a reception channel from an STA which has transmitted the TDLS relay request frame, and the relay STA may be selected by using the RCPI1 information and the RCPI2 information.

The data transmission procedure may further include: performing a procedure for establishing a direct link between the STA that transmits the TDLS relay request frame and an STA that receives the TDLS relay request frame, wherein the data transmitted from the relay STA to the relay destination STA may be transmitted via the direct link.

The relay destination STA may be an access point (AP).

In another aspect, there is also provided a data transmission procedure in a TDLS wireless network, including: transmitting, by a station (STA), a TDLS relay request message having its MAC address set as a relay destination STA; receiving one or more TDLS relay response messages with respect to the TDLS relay request message from one or more STAs; and selecting a relay STA from among the one or more STAs, wherein the relay STA receives data for the relay destination STA and transmits the data to the relay destination STA.

The TDLS relay request message may include a traffic class (TCLAS) element, and only when TCLAS of the received data is matched to that included in the TDLS relay request message, the relay STA may transmit the received data for the relay destination STA.

The TDLS relay response message may include RCPI1 information indicating channel quality of a reception channel from the relay destination STA and RCPI2 information indicating channel quality of a reception channel from an STA which has transmitted the TDLS relay request frame, and the relay STA may be selected by using the RCPI1 information and the RCPI2 information.

The data transmission procedure may further include: performing a procedure for establishing a direct link between the STA that transmits the TDLS relay request frame and an STA that receives the TDLS relay request frame, wherein the data transmitted from the relay STA to the relay destination STA may be transmitted via the direct link.

In still another aspect, there is also provided a data transmission procedure in a TDLS wireless network, wherein a direct link is established between an initiation station (STA) and a peer STA, the initiation STA or the peer STA transmits data to a third STA or receives data from the third STA by using a relay function of the counterpart STA of the direct link, and the data is transmitted via the direct link between the initiation STA and the peer STA.

In yet another aspect, there is also provided a station supporting a data transmission procedure and a direct link setup procedure in the TDLS wireless network.

In yet another aspect, there is also provided a station supporting a tunneled direct link setup (TDLS) wireless network, the station comprising a processor configured to perform a data transmission method, wherein the scanning procedure comprises transmitting a TDLS relay request message including relay destination station (STA) information; receiving one or more TDLS relay response messages with respect to the TDLS relay request message from one or more stations (STAs); and selecting a relay STA from among the one or more STAs, and transmitting data desired to be transmitted to the relay destination STA, to the relay STA.

In yet another aspect, there is also provided a station supporting a station supporting a tunneled direct link setup (TDLS) wireless network, wherein a direct link is established between an initiation station (STA) and a peer STA, the initiation STA or the peer STA transmits data to a third STA or receives data from the third STA by using a relay function of the counterpart STA of the direct link, and the data is transmitted via the direct link between the initiation STA and the peer STA.

A service coverage of a BSS can be extended by using a relay station. Because a station can transmit/receive a frame by using less transmission power, power management can be facilitated and the station can be implemented with low power.

DETAILED DESCRIPTION OF INVENTION

Exemplary embodiments of the present invention will now be described in detail with reference to the accompanying drawings.

A wireless network to which embodiments of the present invention is applicable is a network supporting a direct link setup (DLS) procedure between non-AP stations (STAs). Such wireless network may be, for example, a network supporting a DLS procedure in conformity to IEEE 802.11e standards or a network supporting a tunneled DLS (TDLS) procedure. Hereinafter, the embodiments of the present invention will be described based on the TDLS wireless network, but the present invention is not limited to the TDLS wireless network.

In the TDLS wireless network, although non-AP STAs are associated with a legacy AP, they can establish TDLS link, a direct link therebetween, and release the established TDLS link. In order for one STA to establish the TDLS link with a counterpart STA or release it, the both STAs should be able to transmit and receive a management action frame, e.g., a TDLS frame, via the legacy AP. However, the legacy AP cannot be directly involved in the establishment of the TDLS link by the two non-AP STAs.

One solution to such problem is encapsulating the TDLS frame in the form of a data frame and transmitting the data frame to the counterpart STA by way of the legacy AP. In this case, the legacy AP serves only to relay communication between the non-AP STAs, without being involved in the procedures such as establishing, managing, releasing, and the like, of the TDLS link. Embodiments to be described hereinafter will be usefully applied to the TDLS wireless network in which the TDLS frame encapsulated in the form of the data frame is transmitted and received to establish, release, and manage the TDLS link.

The non-AP STA is an arbitrary device including a medium access control (MAC) following IEEE 802.11 standards and a physical layer with respect to a wireless medium, among devices constituting the TDLS wireless network. The non-AP STA is a wireless device, not an AP, and may be also called by other names such as wireless transmit/receive unit (WTRU), user equipment (UE), mobile station (MS), terminal, mobile subscriber unit, and the like.

The non-AP STA includes a processor and a transceiver, and generally, it may further include a user interface, a display unit, and the like. The processor, a function unit devised to generate a frame to be transmitted via the wireless network or process a frame received via the wireless network, controls the station and performs various signal processing functions inputted by a user and for the user. The transceiver, functionally connected with the processor, is a unit devised to transmit and receive a frame via the wireless network for the station.

The non-AP STA relays a data frame for a counterpart non-AP STA with which it has established a direct link. Relaying of the data frame may be applied also to downlink as well as to uplink. In a state that the non-AP STA establishes the TDLS link with the peer STA, when there is a request from the peer STA, the non-AP STA receives a data frame from the peer STA and relays the received data frame to a different STA, e.g., an AP. Or, the non-AP STA receives a data frame to be transmitted to the peer STA, for the peer STA, instead, and relays it to the peer STA.

The AP may function as a satation and is a function entity that provides an access to a distribution system (DS) by way of a wireless medium for an associated station. According to an embodiment of the present invention, the AP may be a legacy AP not supporting QoS. Such AP may be also called by other names such as centralized controller, base station (BS), node B, a site controller, and the like.

Figure 1:
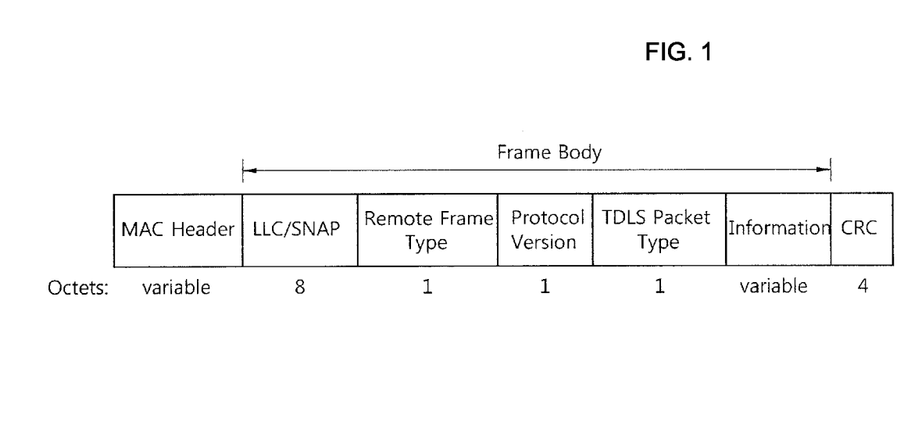
FIG. 1 is a schematic block diagram showing the format of a tunneled direct link setup (TDLS) frame.

FIG. 1 is a schematic block diagram showing the format of a medium access control (MAC) frame (referred to as 'TDLS frame', hereinafter) a first non-AP STA transmits to and receives from a counterpart non-AP STA (or peer STA) by way of the legacy AP in the TDLS wireless network. With reference to FIG. 1, the TDLS frame includes a MAC Header field, a logical link control (LLC)/sub-network access protocol (SNAP) field, a Remote Frame Type field, a TDLS Packet Type field, an Information field, and a cyclic redundancy code (CRC) code. The TDLS frame may further include a Protocol Version field.

The MAC Header field includes information common to substantially every type of frames. For example, the MAC Header field may include a Frame Control field, a Duration/ID field, a plurality of address fields (Address1, Address2, Address3, and Address4), a Sequence Control field, and/or quality of service (QoS) Control field, etc.

Among them, the Frame Control field includes a Protocol Version field, a Type and Subtype field for identifying the function of a frame, a More Fragments field for indicating whether or not there is more fragment subsequent to a current MSDU or MMPDU, a Retry field for indicating whether a frame is a re-transmitted frame, a Power Management field for indicating whether or not it is operated in a power save mode, and the like. The Power Management field of the Frame Control field indicates a mode in which an STA operates after a sequence of frame exchange is successfully completed. For example, when the Power Management field is set as 0, it may indicate that the transmission STA of the frame operates in an active mode, and when the Power Management field is set as 1, it may indicate that the transmission STA operates in a peer power save mode.

The QoS Control field is to identify various QoS-related information about a traffic category (TC) or a traffic stream (TS) to which frames belong, and frames varying according to frame types and sub-types. Such QoS Control field may exist in every TDLS frame having a QoS subfield of a Subtype field set as 1. Each QoS Control field includes five subfields, and Table 1 below shows examples of subfields and various available layouts.

TABLE 1

| Applicable Frame (sub) Types | Bits 0-3 | Bit 4 | Bits 5-6 | Bit 7 | Bits 8-15 |
|---|---|---|---|---|---|
| Qos (+)CF-Poll frames sent by HC | TID | EOSP | Ack Policy | Reserved | TXOP limit |
| Qos Data, Qos Null, and Qos Data+CF-Ack frames sent by HC | TID | EOSP | Ack Policy | Reserved | AP PS Buffer State |
| Qos data frames sent by non-AP to an AP | TID | 0 | Ack Policy | Reserved | TXOP Duration Requested |
| | TID | 1 | Ack Policy | Reserved | Queue Size |
| Qos Data, Qos Null, and Qos Data+CF-Ack frames sent over the direct link | TID | EOSP | Ack Policy | Reserved | Reserved |

With reference to FIG. 1, the LLC/SNAP field includes an LLC/SNAP header. The Remote Frame Type field may be set by a value (e.g., '2') indicating 'TDLS' frame. The Protocol Version field may be set by a value indicating a protocol version of a transmission/reception message.

Figure 2:
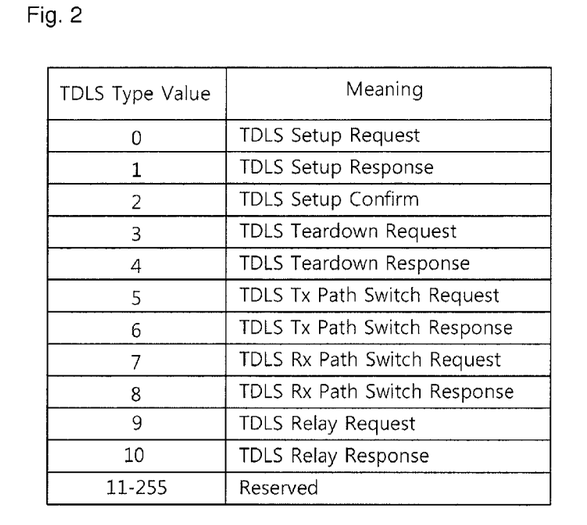
FIG. 2 is a table of examples of types of TDLS frames and corresponding values.

The TDLS Packet Type field may be set by a value for specifying the type of a TDLS frame. Types of the TDLS frames and corresponding values are illustrated in FIG. 2. With reference to FIG. 2, the TDLS frames include a TDLS Setup Request frame, a TDLS Setup Response frame, a TDLS Setup Confirm frame, a TDLS Rx Switch Request frame, a TDLS Rx Switch Response frame, and the like. According to an embodiment of the present invention, the TDLS frames further includes a TDLS Relay Request frame and a TDLS Relay Response frame.

The TDLS Relay Request frame is for the non-AP STA to request another non-AP STA in the TDLS wireless network to relay a frame for the non-AP STA itself. Relay request of a frame can be available for both uplink and downlink. The name of such TDLS Relay Request frame is merely illustrative. In a wireless network (i.e., a wireless network supporting a DLS setup procedure) other than the TDLS wireless network, a format of a management action, not such format of the TDLS frame may be used. The TDLS Relay Response frame is a frame transmitted in response to the TDLS Relay Request frame. Information elements (IEs) that may be included in the TDLS Relay Request frame and the TDLS Relay Response frame will be described later.

With reference to FIG. 1, the CRC field includes supplementary information for an error correction in case where a portion of data is lost or there occurs an error while a corresponding frame is being transmitted.

The Information field of the TDLS frame includes various information individually specified according to a type of each TDLS frame. The information included in the information field differs according to each TDLS type. In this embodiment, IEs included in the Information field of the TDLS Relay Request frame and/or the TDLS Relay Response frame are newly defined.

Figure 3:
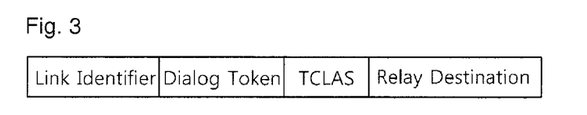
FIG. 3 is a schematic block diagram showing information included in an information field of a TDLS relay request frame according to an embodiment of the present invention.

FIG. 3 is a schematic block diagram showing information included in the Information field of the TDLS Relay Request frame according to an embodiment of the present invention.

With reference to FIG. 3, the Information field of the TDLS Relay Request frame includes elements of a Link Identifier, a Dial Token, Traffic class (TCLAS), and a Relay Destination. The Link Identifier element includes information for identifying a direct link. If the TDLS Relay Request frame is transmitted before a direct link is established, the Link Identifier element is set by a value that permits all the direct links to be established in the future, set by a value indicating an arbitrary direct link, set as 0, or may not include corresponding information. Meanwhile, if the TDLS Relay Request frame is transmitted after a direct link is established, the Link Identifier may include a BSSID to which an STA is currently associated, a MAC address of a source STA, a MAC address of a destination STA, a regulatory class to which an STA is currently associated, channel information, and the like. In case of the TDLS Relay Request frame, the MAC address of the destination STA of the Link Identifier may be set as a broadcast address.

The Dialog Token includes a unique value for discriminating an exchange of the TDLS Relay Request frame and the TDLS Relay Response frame.

The TCLAS element indicates traffic class information of a frame desired to be relayed. In case a UE accepts a relay request, the TCLAS element is used to determine whether or not a traffic class set in the TCLAS element and TCLAS of a data frame (e.g., MPDU) to be relayed are identical. Upon determination, a requested STA relays only frames matched to the TCLAS specified in the TDLS Relay Request frame to the relay destination STA. The purpose and format of the TCLAS element are clarified in '7.3.2.31 TTCLA element' of IEEE P802.11-REVma/D9.0 "Part11: Wireless LAN Medium Access Control (MAC) and Physical Layer (PHY) specifications", so its detailed description will be omitted.

The Relay Destination element includes information indicating a destination STA to which a UE relays a frame upon receiving a relay request. For example, in case of uplink, the Relay Destination element may include a MAC address of an AP set therein. In case of downlink, the Relay Destination element may include a MAC address of an STA that requests relay set therein.

Figure 4:
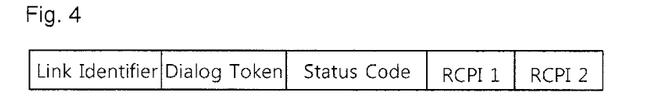
FIG. 4 is a schematic block diagram showing information included in an information field of a TDLS relay response frame according to an embodiment of the present invention.

FIG. 4 is a schematic block diagram showing information included in the Information field of the TDLS Relay Response frame according to an embodiment of the present invention.

With reference to FIG. 4, the Information field of the TDLS Relay Response frame includes elements of a Link Identifier, a Dialog Token, and Status Code. The Information field may further include an RCPI1 element and an RCPI2 element. The RCPI1 and RCPI2 elements, which are illustrative, inform quality of a channel related to relaying of a frame.

The Link Identifier element includes information for identifying a direct link. If the TDLS Relay Response frame is transmitted before a direct link is established, the Link Identifier element is set by a value that permits all the direct links to be established in the future, set by a value indicating an arbitrary direct link, set as 0, or may not include corresponding information. Meanwhile, if the TDLS Relay Response frame is transmitted after a direct link is established, the Link Identifier may include a BSSID to which an STA is currently associated, a MAC address of a source STA, a MAC address of a destination STA, a regulatory class to which an STA is currently associated, channel information, and the like. In case of the TDLS Relay Response frame, the MAC address of the destination STA of the Link Identifier may be set as a MAC address of a STA which has transmitted the RDLS Relay Request frame.

The Dialog Token includes a unique value for discriminating an exchange of the TDLS Relay Request frame and the TDLS Relay Response frame.

The Status Code element indicates a success (acceptance) or failure (rejection or impossibility) with respect to a requested TDLS relay. For example, if an operation indicates a success, the Status Code element may be set as 0, and if the operation indicates a failure, the Status Code element may be set by a certain value indicating the cause of the failure.

As mentioned above, the RCPI1 and RCPI2 elements are illustrative and inform about quality of a channel related to relaying of a frame. For example, the RCPI1 element may indicate an RCPI value with respect to frames received by a relay-requested STA from a STA specified as a relay destination. The RCPI2 element may indicate an RCPI value with respect to frames received from an STA which has transmitted the TDLS Relay Request frame.

The values set in the RCPI1 and RCPI2 elements, namely, the channel quality information, may be used for the STA to determine a relay path of the frame when receiving the values. Namely, the RCPI1 value is used for the requesting STA to determine a relay STA. For example, when the requesting STA receives TDLS Relay Response frames from a plurality of STAs, it may select a STA having good channel state, from among the plurality of STAs that have transmitted the TDLS Relay Response frames, as a relay STA, based on the channel quality information set in the RCPI1 and RCPI2 elements.

In this manner, according to the embodiment of the present invention, by newly defining the TDLS Relay Request frame and the TDLS Relay Response frame, in case a direct link is established and frames are to be transmitted or received by using the direct link, relaying of the frames are allowed for a counterpart STA. Accordingly, although an STA cannot directly communicate with an AP or another STA or is in a troubled situation, the STA can request a relay STA to relay a frame, to thereby communicate with the AP or another STA.

The frame transmission procedure using the TDLS Relay Request frame and the TDLS Relay Response frame in the TDLS wireless network according to an embodiment of the present invention will now be described in detail. In the embodiment of the present invention, it is assumed that the procedure of establishing a direct link is carried out before or after exchanging the TDLS Relay Request and Response frames. First, the procedure of establishing the TDLS link will now be described.

Figure 5:
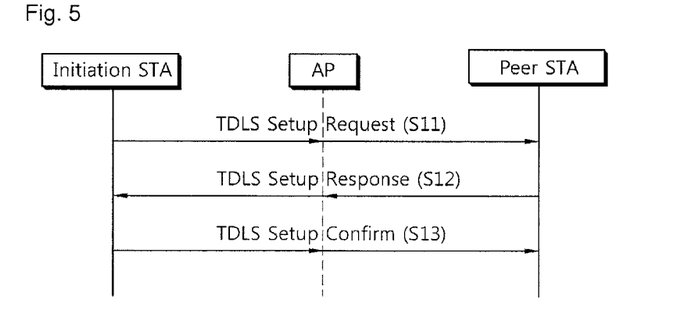
FIG. 5 is a message flow chart illustrating a TDLS setup procedure according to an embodiment of the present invention.

FIG. 5 is a message flow chart illustrating a TDSL establishing procedure in the TDLS wireless network including two non-AP STAs (referred to simply as 'STAs' and discriminated as an initiation STA and a peer STA) and a legacy AP.

With reference to FIG. 5, the initiation STA, which wants to establish a direct link with the peer STA, transmits a frame for requesting setup of a direct link, for example, a TDLS setup request frame, to the peer STA by way of the AP (S11). The TDLS setup request frame may be a frame in which the TDLS packet type field is set by a value indicating the TLDS Setup Request. Accordingly, in step S11, the TDLS setup request is encapsulated in the form of data frame and transmitted, and if the received frame is the TDLS Setup Request frame, the AP serves to relay the TDLS Setup Request frame for the peer STA, i.e., a reception STA.

Upon receiving the TDLS Setup Request frame, the peer STA transmits a TDLS Setup Response frame to the initiation STA also by way of the AP in response to the TDLS Setup Request frame (S12). In this case, in the TDLS Setup Response frame, the TDLS packet type field of FIG. 1 is set as a value indicating the TDLS Setup Response. Thus, the TDLS Setup Response is encapsulated in the form of data frame and transmitted to the initiation STA by way of the AP.

Subsequently, the initiation STA transmits a TDLS Setup Confirm frame with respect to the received TDSL Setup Response frame to the peer STA by way of the AP (S13). In this case, in the TDLS Setup Confirm frame of FIG. 1, the TDLS packet type field is set as a value indicating the TDLS Setup Confirm. The TDLS Setup Confirm is encapsulated in the form of data frame and transmitted by way of the AP. In the TDLS setup procedure, the management action frames are encapsulated in the form of data frame and transmitted without a direct involvement of the AP, having a high possibility that they may be lost in the course of transmission. Thus, in the TDLS setup procedure, the initiation STA (first STA) is allowed to transmit the TDLS Setup Confirm frame with respect to the TDSL Setup Response frame from the peer STA (second STA).

Figure 6:
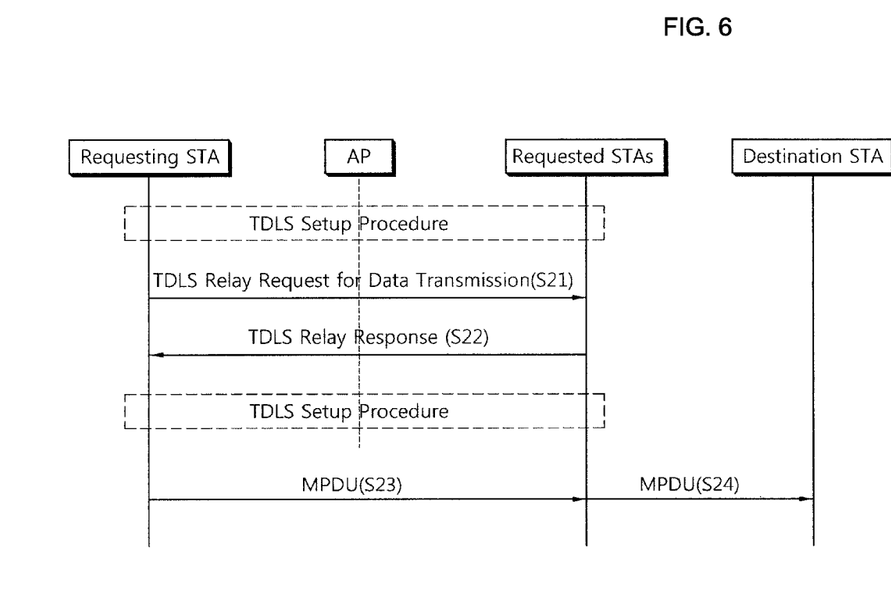
FIG. 6 is a message flow chart illustrating a data transmission procedure in a TDLS wireless network according to one embodiment of the present invention.

FIG. 6 is a message flow chart illustrating a frame transmission procedure in the TDLS wireless network according to one embodiment of the present invention. Specifically, FIG. 6 shows a procedure in which a requesting STA transmits a frame to a destination STA by using a requested STA serving as a relay STA. In this case, the procedure may be an uplink procedure and the destination STA may be an AP.

As afore-mentioned, the TDLS setup procedure may be performed between the requesting STA and the requested STA before or after the TDLS Relay Request frame and the TDLS Relay Response frame are exchanged. In this case, the initiation STA of FIG. 5 may correspond to the requesting STA in FIG. 6, and the peer STA of FIG. 5 may correspond to the requested STA in FIG. 6, but the present invention is not meant to be limited thereto. The TDLS setup procedure may be started by any one of the requesting STA and the requested STA.

With reference to FIG. 6, the requesting STA transmits the TDLS Relay Request frame (S21). The TDLS Relay Request frame may be broadcasted or multicasted, but the present invention is not limited thereto. For example, the TDLS Relay Request frame may be transmitted in a unicast method only to a counterpart of a direct link.

When the requesting STA requests data transmission, the MAC address of a reception STA of the data may be set in the destination STA of the TDLS Relay Request frame. For example, when the requesting STA intents to update data to the AP, the MAC address of the AP may be set in the destination STA. And TCLAS information of the data to be transmitted by the requesting STA is recorded in the TDLS Relay Request frame.

Subsequently, a UE that permits data relay to the relay destination STA, among UEs that have received the TDLS Relay Request frame, namely, the requested STA, transmits a TDLS Relay Response frame including a status code indicating 'Successful' to the requesting STA (S22). Such TDLS Relay Response frame may be transmitted in a unicast method. If the TDLS Relay Request frame is transmitted in a broadcast method, a UE, which does not permit relay to the relay destination STA, does not necessarily transmit the TDLS Relay Response frame to the requesting STA. However, when the TDLS Relay Request frame is transmitted in the unicast method, a requested STA, which does not permit relay to the relay destination STA, should transmit the TDLS Relay Response frame including a status code indicating rejection, impossibility, or the like, and its reason to the requesting STA.

When the requesting STA receives one or more TDLS Relay Response frames, it determines a relay STA by using information indicating link (channel) quality included in the received TDLS Relay Response Frames. For example, the requesting STA may select a relay STA by using the RCPI1 and RCPI2 included in each TDLS Relay Response frame as received.

When a relay STA is selected, the requesting STA transmits a frame to the requested STA selected as the relay STA (S23). The frame may be generally a data frame such as an MPDU or the like, but the present invention is not limited thereto.

Upon receiving the frame from the requesting STA, the requested STA transmits the received data to the relay destination STA (S24). In this case, the requested STA relays the received data only when TCLAS information of the received data is identical to TCLAS specified in the TDLS Relay Request frame.

Figure 7:
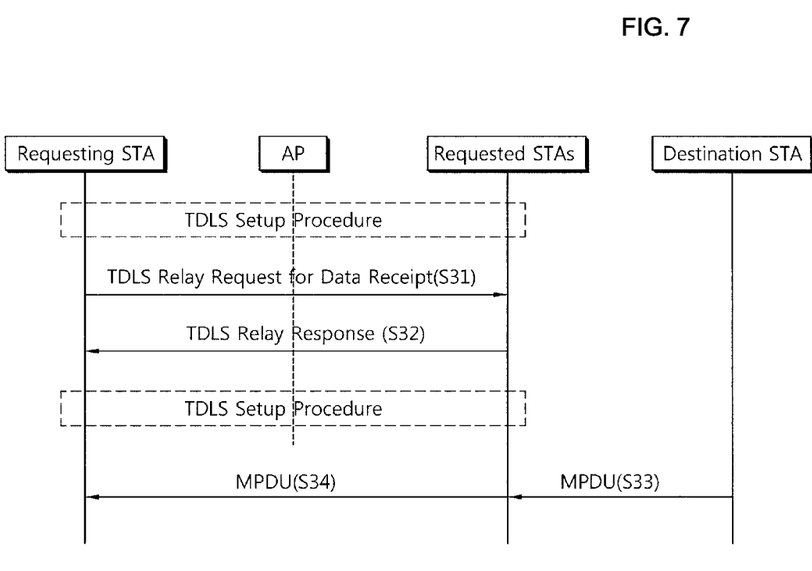
FIG. 7 is a message flow chart illustrating a data transmission procedure in a TDLS wireless network according to another embodiment of the present invention.

FIG. 7 is a message flow chart illustrating a frame transmission procedure in the TDLS wireless network according to another embodiment of the present invention. Specifically, FIG. 7 shows a procedure in which a requesting STA transmits a frame to itself by using a requested STA serving as a relay STA. In this case, the procedure may be an uplink procedure and a destination STA may be the requesting STA.

As afore-mentioned, the TDLS setup procedure may be performed between the requesting STA and the requested STA before or after the TDLS Relay Request frame and the TDLS Relay Response frame are exchanged. In this case, the initiation STA of FIG. 5 may correspond to the requesting STA in FIG. 6, and the peer STA of FIG. 5 may correspond to the requested STA in FIG. 6, but the present invention is not meant to be limited thereto. The TDLS setup procedure may be initiated by any one of the requesting STA and the requested STA.

With reference to FIG. 7, the requesting STA transmits the TDLS Relay Request frame (S31). The TDLS Relay Request frame may be broadcasted or multicasted, but the present invention is not limited thereto. For example, the TDLS Relay Request frame may be transmitted in a unicast method only to a counterpart of a direct link.

When the requesting STA requests the requested STA to relay data desired to be received, the MAC address of the requesting STA may be set in the destination STA of the TDLS Relay Request frame. The present embodiment may be generally used when the requesting STA wants to receive data broadcast or multicast from an AP. Nevertheless, the embodiment of the present invention does not exclude the procedure of relaying data unicast from the AP to the requesting STA. In the TDLS Relay Request frame, TCLAS information of the data to be received by the requesting STA is recorded.

Subsequently, a UE that permits data relay to the relay destination STA to the requesting STA, among UEs that have received the TDLS Relay Request frame, namely, the requested STA, transmits a TDLS Relay Response frame including a status code indicating 'Successful' to the requesting STA (S32). Such TDLS Relay Response frame may be transmitted in a unicast method. If the TDLS Relay Request frame is transmitted in a broadcast method, a UE, which does not permit relay to the relay destination STA, does not necessarily transmit the TDLS Relay Response frame to the requesting STA. However, as the TDLS Relay Request frame is transmitted in the unicast method, a requested STA, which does not permit relay to the relay destination STA, should transmit the TDLS Relay Response frame including a status code indicating rejection, impossibility, or the like, and its reason to the requesting STA.

When the requesting STA receives one or more TDLS Relay Response frames, it determines a relay STA by using information indicating link (channel) quality included in the received TDLS Relay Response Frames. For example, the requesting STA may select a relay STA by using the RCPI1 and RCPI2 included in each TDLS Relay Response frame as received. In this case, although not shown in the drawings, the requesting STA may inform the requested STA that the corresponding requested STA has been selected as a relay STA among the requested STAs which have transmitted the TDLS Relay Response frame, through a confirmation message or a frame of a different format. For example the TDLS Relay Confirm frame may be used for the purpose.

The requested STA selected as the relay STA receives a frame to be transmitted to the requesting STA, e.g., a multicast or broadcast frame or the like (S33). The frame may be generally a data frame such as an MPDU or the like, but the present invention is not limited thereto.

Upon receiving the frame from the requesting STA, the requested STA transmits the received data to the requesting STA (S34). In this case, the requested STA relays the received data only when TCLAS information of the received data is identical to TCLAS specified in the TDLS Relay Request frame.

In the present embodiment, whether or not information of the relay STA is provided to the AP is not particularly limited. Namely, the present embodiment may be applicable to both cases in which the information of the relay STA is provided to the AP and is not to the AP. In case the information of the relay STA is provided to the AP, for example, it can be applicable through a proxy address resolution protocol (ARP) function. According to this, when a UE receives an ARP request and then sends an ARP response, a MAC address of the relay STA may be set. Further, the present embodiment can be also applicable without providing the information of the relay STA to the AP, and in this case, particularly, in case of downlink, the present embodiment can be usefully applicable to broadcast or multicast data.

The above-described embodiments of the present invention may be implemented through any other communication network, e.g., an Internet protocol (IP) solution, without being limited to the TDLS wireless network or the WLAN system. In this case, in the above-described embodiments of the present invention, the relay STA may not be necessarily a device related to the WLAN, and may be a device supporting wireless communication according to any other communication protocol. To this end, in order to comprehensively express the relay STA, the relay STA may be called a WiFi repeater. The WiFi repeater may be, for example, a device supporting IP communication.

In the embodiment described above with reference to FIG. 6, it is assumed that the relay STA, i.e., the requested STA, is the WiFi repeater. In this case, if a default gateway address of the requesting STA (e.g., a laptop computer) is set as an IP address of the WiFi repeater, uplink traffic to the AP, i.e., the destination STA, goes by way of the WiFi repeater. Here, the WiFi repeater transfers a received packet of the uplink traffic to the AP through IP routing.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for transmitting data in a wireless local area network, the method comprising:
    establishing, by a requesting station (STA), a direct link between the requesting STA and a destination STA;
    establishing, by the requesting STA, a relay link between the requesting STA and the destination STA via a relay STA;
    transmitting, by the requesting STA, data to the destination STA via the direct link; and
    transmitting, by the requesting STA, the data to the destination STA via the relay link,
    wherein the data is simultaneously transmitted from the requesting STA to the destination STA via the direct link and the relay link, and
    wherein the step of establishing the relay link includes:
        transmitting, by the requesting STA, a request message to an access point (AP), the request message including an identifier of the destination STA;
        receiving, by the requesting STA, a response message from the AP, the response message including relay capable information of at least one candidate STA, the relay capable information indicating whether the at least one candidate STA is capable of relaying;
        selecting, by the requesting STA, the relay STA among the at least one candidate STA;
        transmitting, by the requesting STA, a link setup request message for establishing the relay link to the relay STA; and
        receiving, by the requesting STA, a relay setup response message from the relay STA.

2. The method of claim 1, wherein the step of establishing the relay link further includes acquiring, by the requesting STA, first channel information between the requesting STA and zero or more STA among the at least one candidate STA and second channel information between zero or more STA among the at least one candidate STA and the destination STA, and
    wherein the selection of the relay STA is performed based on the first channel information and the second channel information.

3. The method of claim 1, wherein the step of establishing the direct link includes:
    transmitting, by the requesting STA, a direct link establishment request frame for establishing the direct link to the destination STA; and
    receiving, by the requesting STA, a direct link establishment response frame from the destination STA.

4. The method of claim 1,
    wherein the direct link is a Tunneled Direct Link Setup (TDLS) direct link.

5. An apparatus for transmitting data in a wireless local area network, the apparatus comprising:
    a transceiver configured to transmit and receive radio signals; and
    a processor configured to:
        establish a direct link between the apparatus and a destination STA,
        establish a relay link between the apparatus and the destination STA via a relay STA,
        transmit data to the destination STA via the direct link, and transmit the data to the destination STA via the relay link,
wherein the data is simultaneously transmitted from the apparatus to the destination STA via the direct link and the relay link, and
wherein the processor is configured to establish the relay link by:
   transmitting a request message to an access point (AP), the request message including an identifier of the destination STA,
   receiving a response message from the AP, the response message including relay capable information of at least one candidate STA, the relay capable information indicating whether the at least one candidate STA is capable of relaying,
   selecting the relay STA among the at least one candidate STA,
   transmitting a link setup request message for establishing the relay link to the relay STA, and
   receiving a relay setup response message from the relay STA.

6. The apparatus of claim 5, wherein the processor is configured to establish the relay link by:
   acquiring first channel information between the apparatus and zero or more STA among the at least one candidate STA and second channel information between zero or more STA among the at least one candidate STA and the apparatus, and
   wherein the relay STA is selected in basis of the first channel information and the second channel information.

7. The apparatus of claim 5, wherein the processor is configured to establish the direct link by:
   transmitting a direct link establishment request frame for establishing the direct link to the destination STA, and
   receiving a direct link establishment response frame from the destination STA.

8. The apparatus of claim 5, wherein
the direct link is a Tunneled Direct Link Setup (TDLS) direct link.

* * * * *